United States Patent
Foti et al.

(10) Patent No.: US 10,496,648 B2
(45) Date of Patent: Dec. 3, 2019

(54) SYSTEMS AND METHODS FOR SEARCHING MULTIPLE RELATED TABLES

(71) Applicant: TIBCO Software Inc., Palo Alto, CA (US)

(72) Inventors: Fletcher Foti, Berkeley, CA (US); Bruce Zuidema, Robbinsville, NJ (US)

(73) Assignee: TIBCO Software Inc., Palo Alto, CA (US)

(*) Notice: Subject to any disclaimer, the term of this patent is extended or adjusted under 35 U.S.C. 154(b) by 0 days.

(21) Appl. No.: 15/427,818

(22) Filed: Feb. 8, 2017

(65) Prior Publication Data

US 2017/0154078 A1 Jun. 1, 2017

Related U.S. Application Data

(63) Continuation of application No. 13/077,918, filed on Mar. 31, 2011, now Pat. No. 9,607,044.

(51) Int. Cl.
*G06F 16/2455* (2019.01)
*G06F 16/22* (2019.01)
*G06F 16/2457* (2019.01)

(52) U.S. Cl.
CPC ...... *G06F 16/2456* (2019.01); *G06F 16/2282* (2019.01); *G06F 16/24554* (2019.01); *G06F 16/24578* (2019.01)

(58) Field of Classification Search
CPC ......... G06F 17/30498; G06F 17/30339; G06F 17/30486; G06F 17/3053; G06F 16/2456; G06F 16/2282; G06F 16/24554; G06F 16/24578
See application file for complete search history.

(56) References Cited

U.S. PATENT DOCUMENTS

| | | | |
|---|---|---|---|
| 5,978,797 A | 11/1999 | Yianilos | |
| 7,107,263 B2* | 9/2006 | Yianilos | G06F 17/30533 |
| 7,203,686 B1* | 4/2007 | Sinclair | G06F 16/2456 |
| 2003/0018620 A1 | 1/2003 | Vishnubhotla | |
| 2004/0002939 A1 | 1/2004 | Arora et al. | |
| 2004/0117380 A1* | 6/2004 | Perrow | G06F 3/0237 |
| 2005/0203739 A1 | 9/2005 | Hwang et al. | |
| 2005/0283501 A1* | 12/2005 | Blaicher | G06F 16/2365 |
| 2007/0136061 A1* | 6/2007 | Kuboyama | G10L 15/142 |
| | | | 704/251 |
| 2009/0037365 A1* | 2/2009 | Sinclair | G06F 16/24549 |
| 2009/0100089 A1* | 4/2009 | Eadon | G06F 17/30486 |
| 2012/0047125 A1* | 2/2012 | Day | G06F 17/30463 |
| | | | 707/714 |

OTHER PUBLICATIONS

PCT/US2011/030837, Search Report and Written Opinion of the International Searching Authority dated Aug. 15, 2011.

* cited by examiner

*Primary Examiner* — Mark D Featherstone
*Assistant Examiner* — Faezeh Forouharnejad
(74) *Attorney, Agent, or Firm* — McGuireWoods LLP

(57) ABSTRACT

Methods, systems, and computer readable media are described herein for processing a query on a parent table and associated child tables to provide efficient search engine functionality. Search grams are determined based on the query and parent records and child records are scanned for the search grams. Gram scores are computed based on a degree of matching between the parent and child records and the search grams.

20 Claims, 6 Drawing Sheets

SYSTEMS AND METHODS FOR SEARCHING MULTIPLE RELATED TABLES

CROSS REFERENCE TO RELATED APPLICATION

The present application is a continuation of U.S. patent application Ser. No. 13/077,918 filed on Mar. 31, 2011, the contents of which are hereby incorporated by reference in their entirety.

TECHNICAL FIELD

The disclosed embodiments relate generally to search systems and methods and, more specifically, relate to search systems and methods providing relational database joins in the context of inexact matching.

BACKGROUND

A popular method of scoring matching data records is to count shared grams between a query and a record. As used herein, gram refers to a fixed size contiguous block of characters (also referred to as polygraphs). A set of search grams can be determined based on a query. The set of grams may be imbedded in a vector space and compared with stored data in an efficient manner. Metrics may be used to score comparisons between the set of grams and the items in stored data.

Data may be stored in separate, but related, tables allowing for efficient use of resources, so that linked data need not be copied. A join combines records from two or more tables and creates a combined data set that may be used as a table. A join is a way to combine fields from two tables by using common values. Joins allow data for a given record to be retrieved—including data stored in separate, but related, tables.

A join in the context of exact matching may be performed by searching for a first aspect of the request in a first table and then searching for a second aspect of a request in a second table, and so on. For example, using separate name and address tables related to each other, searching for "John Smith" at "123 $1^{st}$ St." may be performed by finding a set of "John Smith" entries in the name table, following the relationships to the address table, and then looking for "123 $1^{st}$ St." This search may be easy and relatively efficient, because a matching name entry is clearly defined in an exact matching context.

SUMMARY

According to an aspect of this disclosure, systems are described for searching joined tables for a query. The systems may include a processor in communication with a memory element. The processor may be operable to identify a parent table with parent table partitions with respective parent records grouped therein. The processor may further be operable to identify child tables with child table partitions with respective child records. The child records in the child table partitions are associated with parent records in one of the parent table partitions, and the child records are associated with parent records. The processor may further be operable to determine search grams based on the query. The processor may further be operable to scan parent records in one of the parent table partitions for the search grams. The processor may further be operable to scan child records in child table partitions associated with the parent table partition for the search grams. The processor may further be operable to compute parent gram scores for scanned parent records based on a degree of matching with the search grams and compute child gram scores for scanned child records based on a degree of matching with the search grams. The processor may further be operable to compute aggregate scores for each parent record and its associated child records based on parent and child gram scores. The processor may further be operable to repeat the scanning and computing for each of the parent table partitions and for each of the associated child table partitions.

According to an aspect, the processor is further operable to generate a mapping structure having parent and child table partition association information and parent and child records association information. The mapping structure may be stored in the memory element.

According to another aspect, the processor is further operable to reference the mapping structure stored in the memory element to determine associations between parent and child table partitions and between parent and child records.

According to another aspect, the processor is further operable to determine an order for aggregate scores and to generate an ordered list of parent records and child records based on the order of aggregate scores. The ordered list may be stored in the memory element.

According to another aspect, the system also includes an input element for receiving the query from a user.

According to another aspect, the system also includes a display element for displaying search results to a user.

According to another aspect of this disclosure, methods are disclosed for searching joined tables for a query. The method includes performing an efficient query on a parent table and joined child tables. The method may include identifying a parent table with parent table partitions including respective parent records grouped therein and identifying child tables each having child table partitions including respective child records grouped therein. The child records grouped in a child table partition are associated with parent records grouped in one of the parent table partitions and the child records are associated with parent records. The method may also include determining search grams based on the query. The method may also include scanning parent records in one of the parent table partitions for the search grams and scanning child records in child table partitions associated with the parent table partition for the search grams. The method may also include computing parent gram scores for scanned parent records based on a degree of matching with the search grams. The method may also include computing child gram scores for scanned child records based on a degree of matching with the search grams. The method may also include computing aggregate scores for each parent record and its associated child records based on parent and child gram scores. The method may also include repeating the scanning and computing for each of the parent table partitions and for each of the associated child table partitions.

According to an aspect, the method may also include inserting a new child record into any of the child table partitions associated with an identified parent table partition containing a parent record associated with the new child record.

According to an aspect, the method may also include inserting the new child record into any available row in the child table partitions associated with the identified parent table partition.

According to an aspect, the method may also include generating a mapping structure having parent and child table partition association information and parent and child records association information and referencing the mapping structure to determine associations between parent and child table partitions and between parent and child records.

According to an aspect, the method may also include determining an order for aggregate scores and generating an ordered list of joined parent records and child records based on the order of aggregate scores.

According to an aspect, the method may also include receiving the query from a user.

According to an aspect, the method may also include providing query results to the user based on the aggregate scores.

According to an aspect, the method may also include outputting the aggregate scores into a parent table partition-sized output array.

DETAILED DESCRIPTION

In the context of inexact matching, the definition of a "matching" record is not clearly defined. For example, depending on the metric used, each name record may receive a score between 0.0 and 1.0, and each address record may receive a score between 0.0 and 1.0—in fact, every record may receive a score. It is not sufficient to find the "best" matches in each table and then merge the results, because some records that did not make it into the "best" matches for each table, when considered together, may outscore records obtained from individualized queries on each table.

Current search engines do not support joins in the context of inexact matching. For a query to span tables or relationships, a single, denormalized table first is created and loaded into the engine's in-memory database. This approach may not be practical if the cardinality of the joins is significant and/or many tables are joined together. Furthermore, updates to denormalized data introduce significant complexity.

Commonly owned U.S. Pat. No. 5,978,797 entitled, "Multistage intelligent string comparison method" to Yianilos (the '797 Patent), the entirety of which is herein incorporated by reference, discloses a method of searching a collection of strings for strings most similar to a given query string, in which bipartite matching is performed for some or all classes of characters or character clusters ("polygraphs") found in the query string. The resulting matching costs are combined to yield a similarity score for each string in the collection. Commonly owned U.S. Pat. No. 7,107,263 entitled, "Multistage intelligent database search method" to Yianilos et al., the entirety of which is incorporated by reference for all purposes, discloses a number of extensions to the teachings of the '797 Patent.

Figure 1:
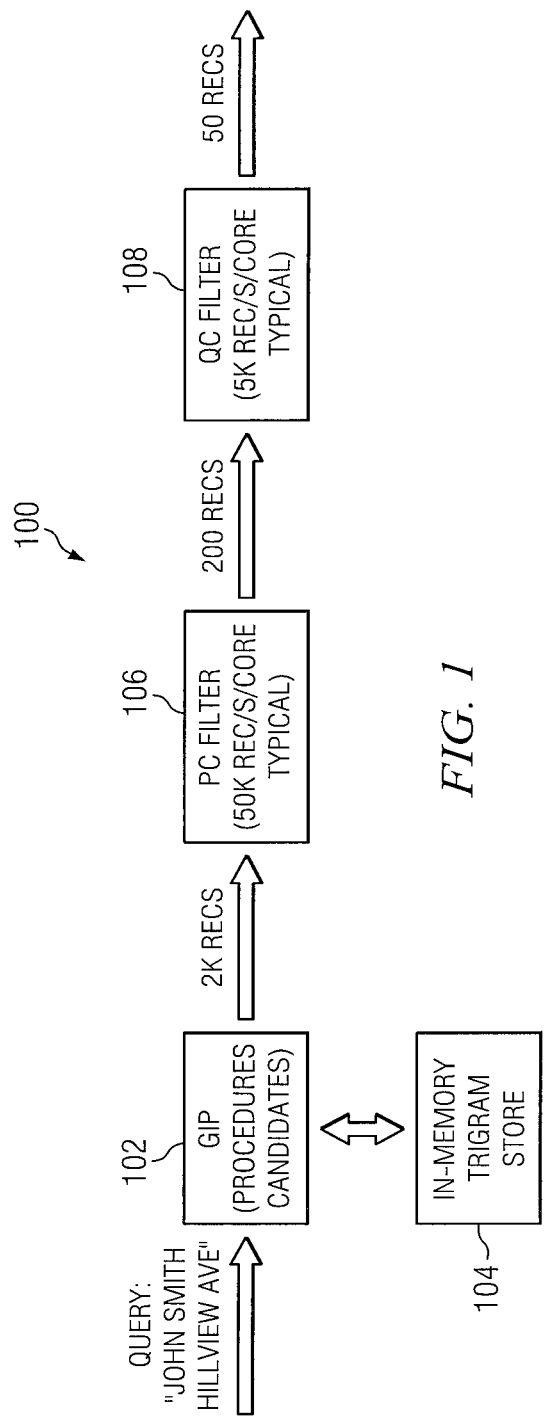
FIG. 1 is a schematic diagram illustrating a process for filtering structured or semi-structured data, in accordance with the present disclosure.

FIG. 1 is a schematic diagram illustrating a process 100 for filtering structured and/or semi-structured data. A query is initiated (e.g., "John Smith Hillview Ave" over a structured and/or semi-structured data set. At a candidate generation stage 102, an index data structure 104 associated with the data set is queried to determine matches in the data set for a given query field. Results (e.g., 2000 records) from the candidate generation stage 102 are passed to a first filter stage 106. The first filter stage 106 produces and filters records expected to score the highest out of the data set. In an embodiment, the first filtering stage may count the co-occurrence of variable length grams. Results (e.g., 200 records) from the first filter stage 106 are passed to a second filter stage 108. The second filter stage 108 produces scores that are returned to the user in a result set. In an embodiment, the second filtering stage may enhance the results by considering positional information of matching grams. Thus, the candidate generation stage 102 is a prefilter component generating candidates that subsequent filters or scoring stages 106, 108 may refine.

For a query to span tables or relationships, one approach would be to first create a single, denormalized table and load it into an in-memory database. But this approach has its drawbacks including inefficiency if the cardinality of the joins is significant or many tables are joined together. Updates to data would introduce significant complexity into the system. In an embodiment, the matching engine may be enhanced to support a query spanning tables or relationships in an efficient way. Searching joined tables in the context of inexact matching may be performed at a prefilter stage 102, allowing the prefilter stage 102 to generate joined records.

Figure 2:
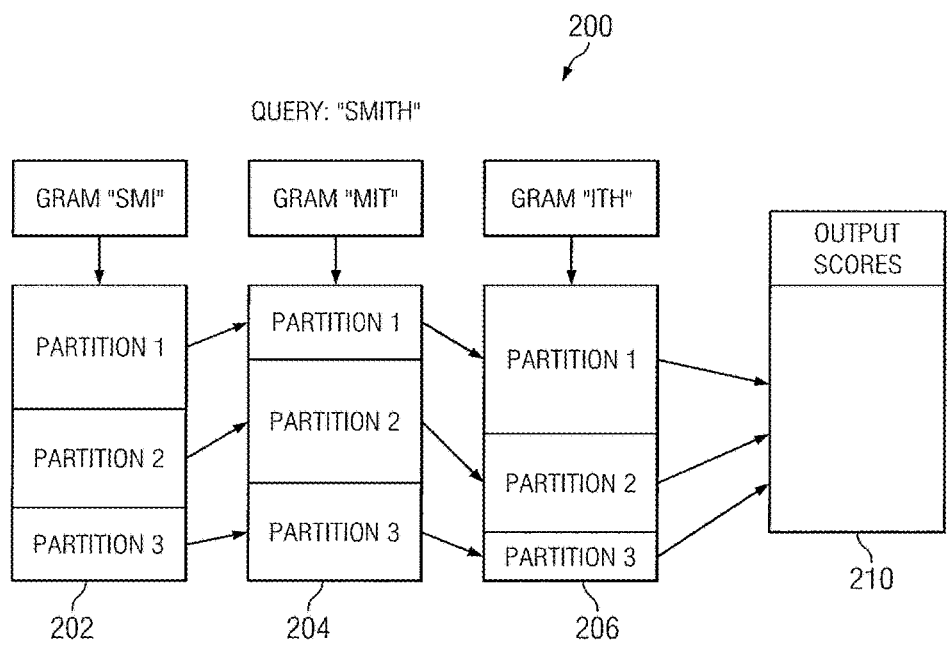
FIG. 2 is a schematic diagram illustrating gram counting for a single table having partitioning, in accordance with the present disclosure.

FIG. 2 is a schematic diagram 200 illustrating gram counting for a single table with partitions. In an embodiment, gram counts may be computed efficiently by using a partitioning method which takes advantage of modern processor caching architectures. The throughput of a matching engine (e.g., 100 in FIG. 1) may increase by more than three-fold in most scenarios when partitioning methods are used.

Each gram (e.g., "SMI," "MIT," and "ITH" for the query "SMITH") has an associated vector of records 202, 204, 206 which contain that gram. Each vector of records 202, 204, 206 is partitioned into blocks of a given size (e.g., 64K entries) over the domain of all possible record IDs.

Processing of the table is done in a two-step process. A first step occurs across the list of grams in the query for each partition in the sequence (i.e., across gram vectors 202, 204, 206). Thus, a single output vector 210 may hold the summed scores of shared grams. In an embodiment, the output vector 210 is substantially equal to a partition size of the gram vectors 202, 204, 206 (e.g., 64K entries). But, it should be noted that the partitions of the associated gram vectors 202, 204, 206 are typically smaller than the partition size of the output vector 210 and are of varying sizes, as not all records in a partition of the associated gram vectors 202, 204, 206 will contain a given gram.

A second step occurs by adding the scores to an output heap (not shown). In an embodiment, if a score is larger than a minimum score in the output heap, the scored record is added to the output heap. In an embodiment, a record ID and a score are added to the output heap. Accordingly, the output heap collects the top-scoring records to be passed to a next stage of filtering.

By processing the gram counts by using the partitioning method discussed above, small, contiguous chunks of memory may be processed together, and an order of magnitude speed improvement is attained.

Figure 3:
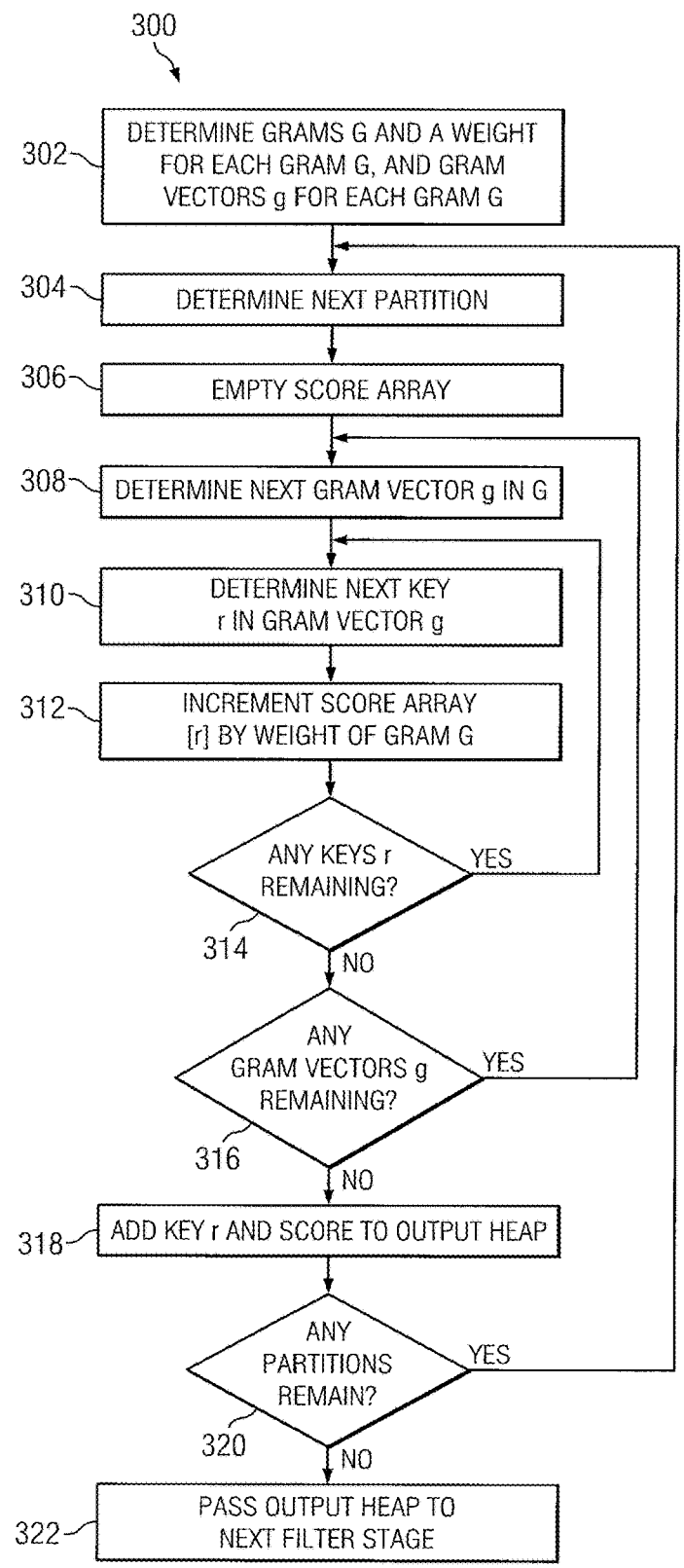
FIG. 3 is a flow diagram illustrating an exemplary flow for scoring records in a prefilter stage, in accordance with the present disclosure.

FIG. 3 is a flow diagram illustrating exemplary process 300 for scoring records in a prefilter stage. In an embodiment, keys r are the primary key of a record. Within a gram vector g, keys r may be sorted by increasing key in each partition. At action 302, grams G that are part of a given query, a weight for each gram G, and the gram vectors g for each gram G are determined. At action 304, the next partition in the table being scanned for the query is determined. The first time through the process, the "next partition" will be the first partition in the table. At action 306, a score array (e.g., score [ . . . ]) is emptied. At action 308, the next gram vector g in gram G is determined. The first time through the process, the "next gram vector g" is the first gram vector g. At action 310, the next key r in the gram vector g is determined. At action 312, the score array is incremented by the weight of gram G. At action 314, it is determined whether any keys r are remaining in the partition. If so, the process reverts back to action 310 and the next key r is determined. If no, at action 316, it is determined whether any gram vectors g are remaining. If so, the process reverts back to action 308 and the next gram vector g is determined. If no, at action 318, the key r and the score is added to an output heap. At action 320, whether any partitions remain in the table is determined. If so, the process reverts back to action 304 and the next partition is determined. If no, the output heap is passed to the next filter stage at action 322.

Figure 4:
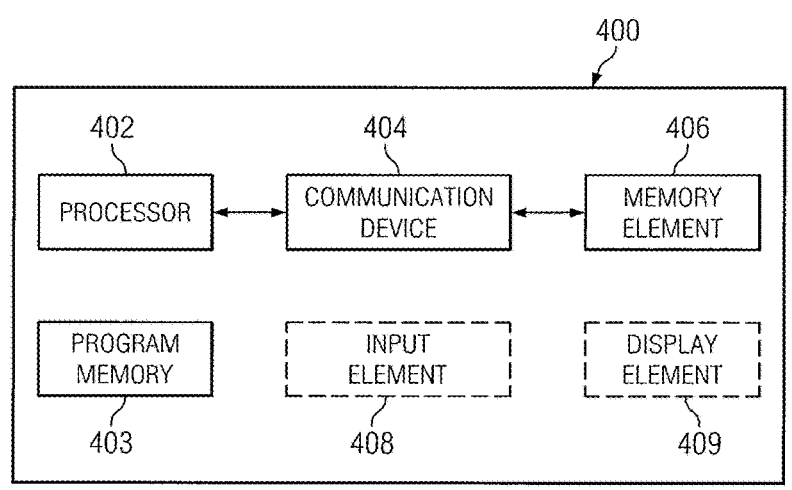
FIG. 4 is a schematic diagram illustrating a system for searching joined tables for a query, in accordance with the present disclosure.

FIG. 4 is a schematic diagram illustrating a system 400 for searching joined tables for a query in the context of inexact matching. The system 400 may be used with a plurality of computing environments including, but not limited to, a desktop personal computer or laptop, a machine connected to a cloud computing environment, a machine in a distributed computing environment or a networked computing environment, a personal handheld device (e.g., a mobile phone, PDA, or tablet), in a server accessible by middleware between a sender and receiver machine, a system having a processing unit and fast cache memory with a larger main memory, etc. In general, the system 400 may be adapted to any computing environment utilizing search capabilities.

The system 400 includes a processor 402, communication device 404, memory element 406, and program memory 403. Program memory 403 may store programs and algorithms used by the processor 402 for searching tables for a query. In an embodiment, the system 400 further includes an input element 408 and a display element 409. In an embodiment, the communications device 404 may be a communications bus for transferring data between processor 402 and memory element 406. FIG. 4 shows a single processor 402, communication device 404, program memory 403, and memory element 406 for simplicity sake, but the system 400 may include a plurality of these elements. For example the system 400 may include parallel processors or distributed processors for implementing separate search instances. The system 400 may also include multiple memory elements.

In general, the processor 402 is operable to perform an efficient query on a parent table and joined child tables. Search grams are determined based on the query and parent records and child records are scanned for the search grams. Gram scores are computed based on a degree of matching between the parent and child records and the search grams.

More specifically, the processor 402 may identify a parent table with parent table partitions having parent records. The processor 402 may also identify child tables with child table partitions having child records. The child records grouped in the child table partition are associated with parent records grouped in one of the parent table partitions. Further, the child records are associated with the parent records.

The processor 402 may also determine search grams based on the query. The processor 402 is operable to scan the parent records in a first parent table partition for the search grams. The processor 402 is also operable to scan the child records in child table partitions that are associated with the first parent table partition for the search grams. The processor may compute gram scores for the scanned parent records and scanned child records based on a degree of matching between the parent and child records and the search grams. The processor 402 may then compute an aggregate score for each parent record and its associated child records based on the parent and child gram scores. The processor 402 may repeat the scanning and computing actions for each of the parent table partitions and their associated child table partitions.

Memory element 406 may be used for temporary or permanent storage of tables, records, query strings, grams, look up tables, search results, computed costs associated with results, mapping structure, ordered lists, and/or other variables and values used by the processor 402. In some embodiments, the memory element 406 is used for temporary storage. For example, in some embodiments, the system 400 may be located remotely from the joined tables. The system 400 may duplicate tables, fields, and/or records from the remote storage into the memory element 406 for processor computation. Alternatively, in some embodiments, the system 400 includes a central processing unit 402 accessing a fast cache memory element 406 via a communication channel 404. The system 400 may also be able to search a remote set of joined tables, e.g., in a networked computing environment or cloud computing environment, without duplicating the records from the remote tables. In some embodiments, the memory element 406 may also be a more permanent storage element accessed by the processor 402. For example, in handheld mobile device or tablet embodiments, the processor may search joined tables in a local memory element 406. In some embodiments with direct processor 402 to local memory element 406 access, however, the system may still have an additional memory element 406 for storing variables, values, and other items.

Figure 5A:
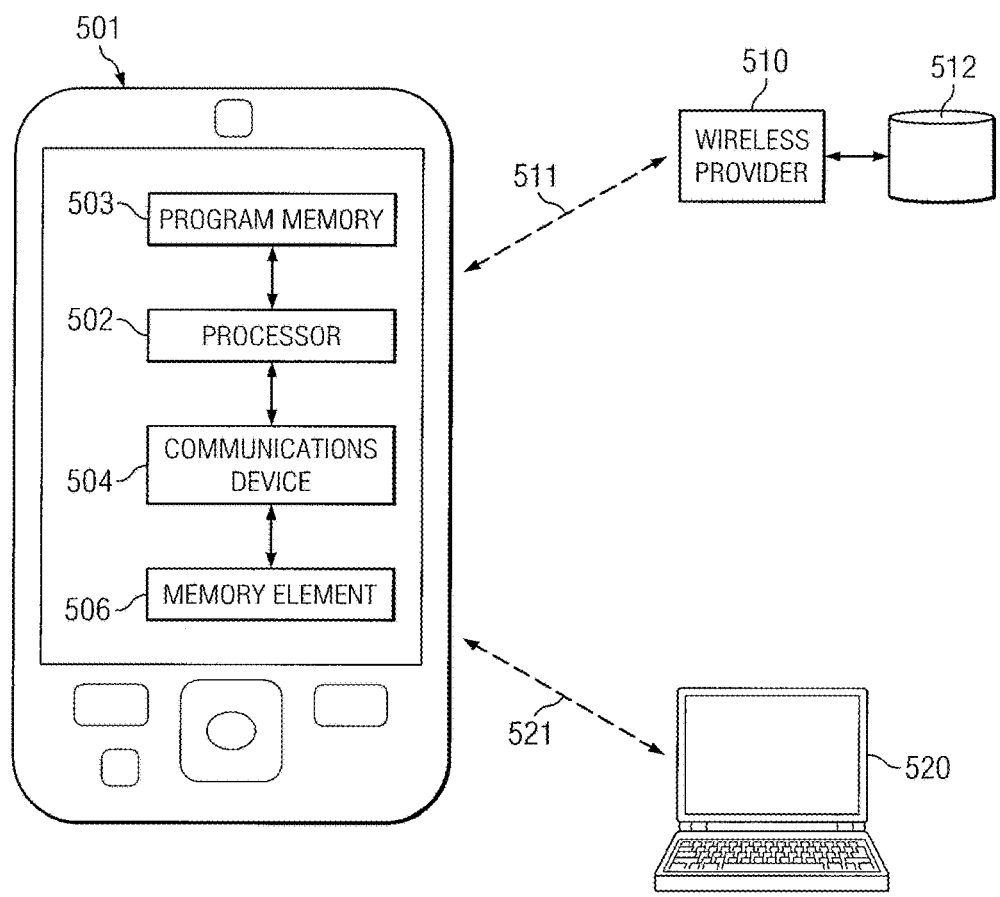
FIG. 5A is a schematic diagram illustrating an exemplary environment for a system for searching joined tables for a query, in accordance with the present disclosure.
Figure 5B:
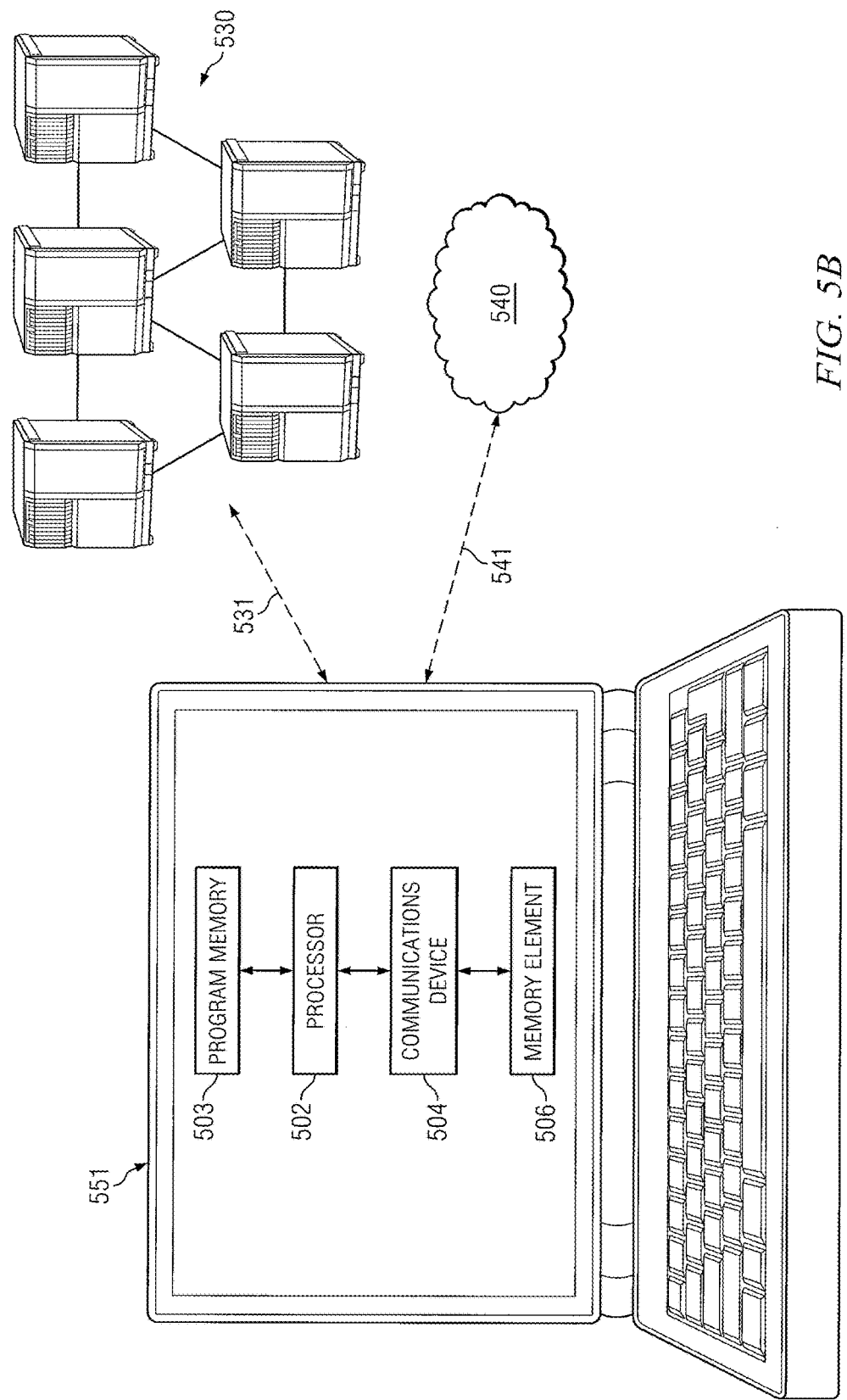
FIG. 5B is a schematic diagram illustrating another exemplary environment for a system for searching joined tables for a query, in accordance with the present disclosure.

As discussed above in relation to FIG. 4, the system 400 may be adapted to a variety of computing environments. FIGS. 5A and 5B are schematic diagrams illustrating exemplary computing environments using the system 400.

FIG. 5A is a schematic diagram of a handheld mobile device system 501 for searching a joined tables for a query in the context of inexact matching. The system 501 includes a processor 502, communications device 504, program memory 503, and memory element 506, each of which are operable as discussed above in relation to FIG. 4.

The processor 502 is operable to receive a query, perform the query on a parent table and joined child tables using inexact matching, and provide results of the search. Program memory 503 may store programs and algorithms used by the processor 402 for searching tables for a query. The memory element 506 is operable to store a variety of items including, but not limited to, tables, records, query strings, grams, look up tables, search results, computed costs associated with results, mapping structure, ordered lists, and/or other variables and values used by the processor 502. The communication device 504 is operable to transfer data between processor 502 and memory element 506.

A handheld mobile device user may perform a variety of searches with the system 501. For example, the mobile device user may do a string-based query over the mobile device e-mail inbox. The system 501 may search local storage of the handheld mobile device. In some embodiments, the mobile device may be in communication with (e.g., connection 511) remote servers and data storage 512 via a wireless provider. Thus, the system 501 may be used to access and search remote data storage 512 wirelessly through the user's wireless provider 510. The mobile device may be tethered to or in wireless communication with (e.g., connection 521) a personal computer 520, and the system 501 may be used to search storage within the personal computer. As discussed above, tables in remote storage (e.g., the data storage 512 or remote system 520) and in local storage may be searched using the processor 502; or the tables may be duplicated at the memory element 506, in which case the processor 502 may search the duplicated tables.

FIG. 5B is a schematic diagram of a personal computer system 551 for searching joined tables for a query in the context of inexact matching. The system 551 includes a processor 502, communications device 504, program memory 503, and memory element 506, each of which are operable as discussed above in relation to FIG. 2.

The processor 502 is operable to receive a query, perform the query on a parent table and joined child tables using inexact matching, and provide results of the search. Program memory 503 may store programs and algorithms used by the processor 502 for searching tables for a query. The memory element 506 is operable to store a variety of items including, but not limited to, tables, records, query strings, grams, look up tables, search results, computed costs associated with results, mapping structure, ordered lists, and/or other variables and values used by the processor 502. The communication device 504 is operable to transfer data between processor 502 and memory element 506.

A personal computer user may perform a variety of searches with the system 551. For example, the personal computer user may do a string-based search for files and folders. The system 551 may search local storage. In some embodiments, the personal computer may be in communication with (e.g., connection 531) networked computers 530. Thus, the system 551 may be used to access and search remote data stored throughout the computer network. The personal computer may also be in communication with a cloud computing environment 540 via the internet, and the system 551 may be used to search storage within the cloud. As discussed above, tables in remote storage (e.g., the computing network 530 or cloud environment 540) and in local storage may be searched using the processor 502; or the tables may be duplicated at the memory element 506, in which case the processor 502 may search the duplicated tables.

Referring back to FIG. 4, the system 400 may be used to perform a query over a table in any computing environment including, but not limited to, the exemplary environments discussed in relation to FIGS. 5A and 5B. The system 400 of FIG. 4 and the systems 501, 551 of FIGS. 5A and 5B, including processor 402, 502, communication device 404, 504, memory element 406, 506, and program memory 403, 503 may be used to perform the methods discussed below.

Figure 6:
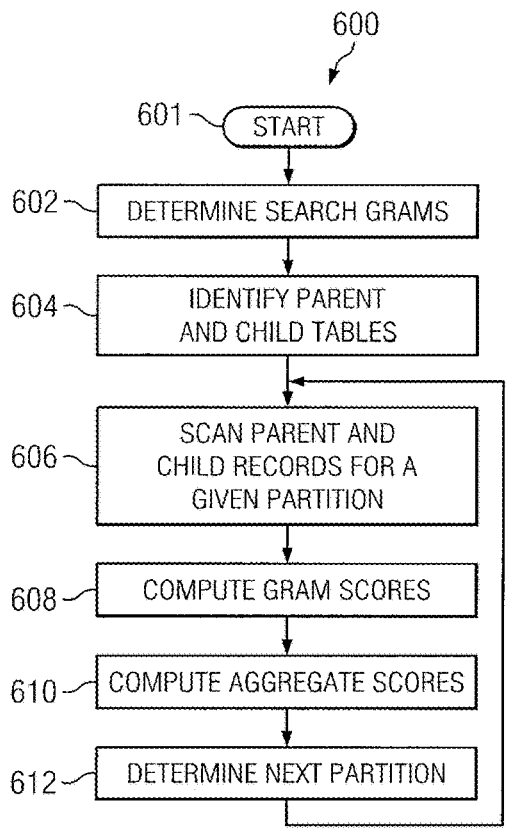
FIG. 6 is a flow diagram illustrating process for searching joined tables for a query, in accordance with the present disclosure.

FIG. 6 is a flow diagram 600 illustrating a process for searching a set of joined tables for a query in the context of inexact matching. The process begins at action 601. At action 602, search grams are determined based on the query. Action 602 may take place before or after other actions in the process 600. For example, action 602 may take place before or after parent tables and child tables are identified at action 604.

At action 604, a parent table is identified. The parent table has parent table partitions including respective parent records. Also at action 604, child tables are identified. The child tables have child table partitions including respective child records. The identified child table partitions are associated with a parent table partition. The child records grouped in the identified child table partitions are associated with parent records grouped in the parent table partition. The child records are also associated with parent records. In various embodiments, child records are associated with parent records via a foreign key field, via common unique values, or other methods of association. In an embodiment, the parent table may be joined with multiple child tables.

The parent table may also be joined with a chain of child tables. Each child table in the chain of child tables would have child table partitions such that child records grouped in a child partition are associated with a record from the preceding table in the chain grouped within one of the preceding table partitions. This will support joins across an entire chain or subsets of a chain of tables. Thus, in an embodiment, any chain of child records would relate back to a parent record, such that the partitioning and scoring scheme may be applied recursively. In some embodiments, the chained tables are remapped into an equivalent star arrangement.

At action 606, parent records in the first parent table partitions for the search grams are scanned. The child records in child table partitions associated with the first parent table partition are also scanned for the search grams.

At action 608, parent gram scores for scanned parent records are computed based on a degree of matching with the search grams. Child gram scores for scanned child records are also computed based on a degree of matching with the search grams.

At action 610, aggregate scores for each parent record and its associated child records are computed based on parent and child gram scores. Aggregate scores may be output into a parent table partition-sized output array. An aggregate scores array represents record scores for the current parent partition.

In an embodiment, aggregate scored records are added to an output heap. In an embodiment, a set of record IDs are added to the output heap based on the aggregate scores. In an embodiment, only record IDs with scores above some minimum score are added to the output heap. The minimum score can be set based on heuristics or other preferred inclusiveness standards. In an embodiment, the process may also include determining an order for scored records in the output heap. The output heap represents selected records for partitions processed so far.

At action 612, the next parent table partition and associated child table partitions are determined and the process reverts back to action 606.

Actions 606, 608, 610, and 612 are repeated for each of the parent table partitions and for each of the associated child table partitions.

An example of actions 606, 608, 610, and 612 is provided below. Given a parent table NAMES and child tables ADDR and PHONE, scores for a partition in NAMES are accumulated in an aggregate score array. An associated ADDR table partition is scanned and a scores array for ADDR is generated. The scores for ADDR are summed into the NAMES aggregate score array. An associated PHONE table partition is scanned and a scores array for PHONE is generated. Those scores are also summed into the NAMES aggregate score array. The NAMES aggregate scores array then contains the total score for each record in a that partition. The NAMES aggregate scores array may be analyzed to determine which records qualify to be added to the output heap.

In practice, depending on the type of join, multiple copies of the child table scores array may be generated, and total record score generation may involve more complexity than just summing into the parent array.

An aggregate score may be determined after processing a partition. Without partitioning, the scores for all records in all of the tables would be computed and saved before the aggregate score could be determined.

Thus, the aggregate scores arrays are a working set for a current partition and the output heap is a set of selected records. Any sort of cut-off criteria may be applied to the output heap.

In an embodiment, the process also includes a new child record being inserted into any of the child table partitions associated with an identified parent table partition containing a parent record associated with the new child record. The new child record may be inserted into any available row in the child table partitions associated with the identified parent table partition, or if no row is available in any existing child table partition associated with the parent table partition, a new child table partition may be generated and associated with the parent table partition. In an embodiment, the process also includes generating a mapping structure having parent and child table partition association information and parent and child records association information. The mapping structure may be referenced to determine associations between parent and child table partitions and between parent and child records. In an embodiment, for outer joins where records are not associated with a parent record, a special parent table partition that represents "no parent record" may be used.

The process may also include receiving the query from a user and providing query results to the user based on the aggregate scores.

As discussed above, in the context of inexact matching, a "matching" record is hazily defined. For example, there is no clear definition of a "matching" name or a "matching" address. To find the best overall "match" the quality of the match in a parent table is considered in tandem with the quality of match in the child table.

Thus, tables may be queried in parallel while maintaining the "cache synchronicity" used for high performance while summing gram scores across tables—i.e. when performing a join. If the name table is sorted by name id and the address table is sorted by address id, then the relationships between the name and address tables will be in random order, which results in memory being accessed in random order rather than—as preferred—in contiguous chunks.

In an embodiment, a child table's gram vectors are sorted by foreign key—e.g., the parent entry key associated with each child entry. So if a given child record's associated parent record belongs to partition 1 of the parent table, that record belongs to partition 1 of the child table.

Figure 7:
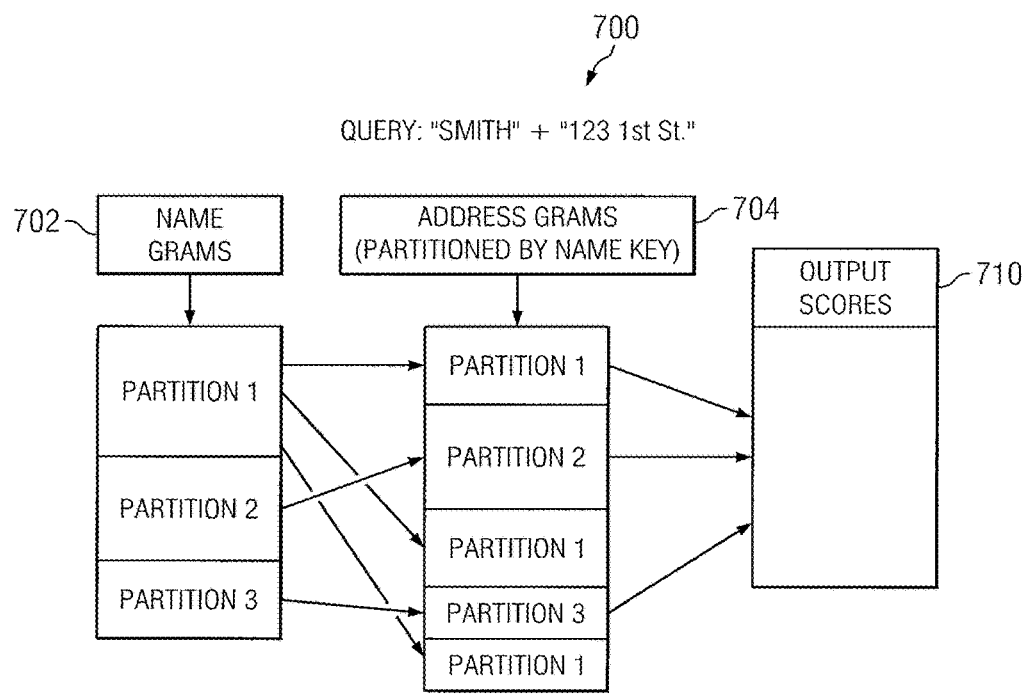
FIG. 7 is a schematic diagram illustrating gram counting across joined tables, in accordance with the present disclosure.

FIG. 7 is a schematic diagram 700 illustrating gram counting across joined tables. The vector 702 is a parent table vector (e.g., a name gram vector), and the vector 704 is a child table vector (e.g., an address gram vector). The child table vector 704 is sorted such that if a given child record's associated parent record belongs to partition 1 of the parent table, that record belongs to partition 1 of the child table.

In an embodiment, the child records are sorted by a parent record key within each partition. In another embodiment, the child vector entries for each child partition are not sorted within each partition. As long as the child belongs to the right partition (i.e., the partition associated with the associated parent record), cache synchronicity may be maintained. This also allows for efficient inserts and deletes.

Since it is possible that a many-to-one relationship may exist between child records and a parent record, a given partition may occur multiple times in the child table's index. Thus, a structure which maps a parent partition to its child partitions is used.

In this way, it is still possible to maintain an output array 710 of size equal to the partition size, and to process a small handful of contiguous chunks of memory for each partition. This maintains the cache synchronicity necessary to perform this algorithm in a time reasonable for most businesses. Inserts and deletes are as efficient as in the non-partitioned case, and the data structure for the underlying tree of gram vectors can remain untouched. In addition, the algorithm may be extended so that multiple many-to-one relationships can be accommodated—i.e., multiple child tables for a parent table and a chain of child tables each related to the previous child table (star schema, cascaded one-to-many join).

In some embodiments, a method is provided for processing a query. The method comprises: determining one or more search grams based on the query, each of the one or more search grams being at least a portion of the query, wherein determining the one or more search grams comprises determining at least one gram vector for each search gram of the one or more search grams; identifying a parent table having one or more parent table partitions including one or more parent records; identifying one or more child table partitions from one or more child tables, the one or more child table partitions including one or more child records, wherein the one or more child table partitions are associated with at least one of the one or more parent table partitions; scanning parent records in a parent table partition for the one or more search grams; and scanning child records in one or more child table partitions associated with the parent table partition for the one or more search grams, wherein gram vectors associated with a child table from the one or more child tables are sorted by a foreign key.

In some embodiments, the method further comprises computing parent gram scores for the scanned parent records based on a degree of matching with the one or more search grams; and computing child gram scores for the scanned child records based on a degree of matching with the one or more search grams.

In some embodiments, the method further comprises computing aggregate scores based on the parent and child gram scores; and repeating the identifying one or more child table partitions, scanning parent and child records, and computing parent and child gram scores and aggregate scores for each parent table partition.

In some embodiments, the method further comprises adding, based on the aggregate scores, parent records and child records to an output heap; and providing query results based on the aggregate scores.

In some embodiments, the method further comprises providing query results based on the aggregate scores.

In some embodiments, determining the one or more search grams further comprises determining a weight of each search gram of the one or more search grams, and wherein computing the aggregate scores comprises incrementing a score array by a weight of at least one search gram of the one or more search grams.

In some embodiments, the method further comprises generating a mapping structure having parent and child table partitions association information; and referencing the mapping structure to determine associations between parent and child table partitions.

In some embodiments, the method further comprises determining a new child record for inserting into a child table partition associated with a parent table partition having a parent record associated with the new child record; in response to determining an available row exists in the child table partition, inserting the new child record into the available row; and in response to determining an available row does not exist in the child table partition, generating a new child table partition, associating the new child table partition with the parent table partition, and inserting the new child record into the new child table partition.

In some embodiments, a portion of a first search gram of the one or more search grams overlaps with a portion of a second search gram of the one or more search grams.

In some embodiments, the foreign key comprises a key associated with the parent table.

In some embodiments, the parent table is joined with multiple child tables.

In some embodiments, child records comprised in a child table partition are associated with parent records in a parent table partition via a foreign key field or via common unique values.

In some embodiments, the one or more search grams scanned for during the scanning of the parent records are different from the one or more search grams scanned for during the scanning of the child records.

In some embodiments, a special partition associated with the parent table is used for an outer join not associated with a parent record.

In some embodiments, the outer join comprises a child record.

In some embodiments, a system is provided for processing a query. The system comprises a processor; a memory element; and a communications device, wherein the processor and memory element are in communication via the communications device, and wherein the processor is operable for: determining one or more search grams based on the query, each of the one or more search grams being at least a portion of the query, wherein determining the one or more search grams comprises determining at least one gram vector for each search gram of the one or more search grams; identifying a parent table having one or more parent table partitions including one or more parent records; identifying one or more child table partitions from one or more child tables, the one or more child table partitions including one or more child records, wherein the one or more child table partitions are associated with at least one of the one or more parent table partitions; scanning parent records in a parent table partition for the one or more search grams; and scanning child records in one or more child table partitions associated with the parent table partition for the one or more search grams, wherein gram vectors associated with a child table from the one or more child tables are sorted by a foreign key.

In some embodiments, the processor is further operable to add selected parent records associated with one or more parent table partitions and selected child records associated with one or more child table partitions to an output heap.

In some embodiments, the system further comprises an input element for receiving the query from a user.

In some embodiments, the system further comprises a display element for displaying search results to a user.

In some embodiments, a non-transitory computer readable medium is provided including instructions that, when executed by a processor, cause the processor to perform a process for processing a query, the process comprising: determining one or more search grams based on the query, each of the one or more search grams being at least a portion of the query, wherein determining the one or more search grams comprises determining at least one gram vector for each search gram of the one or more search grams; identifying a parent table having one or more parent table partitions including one or more parent records; identifying one or more child table partitions from one or more child tables, the one or more child table partitions including one or more child records, wherein the one or more child table partitions are associated with at least one of the one or more parent table partitions; scanning parent records in a parent table partition for the one or more search grams; and scanning child records in one or more child table partitions associated with the parent table partition for the one or more search grams, wherein gram vectors associated with a child table from the one or more child tables are sorted by a foreign key.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for querying a parent table and one or more child tables, the method comprising:
   generating a mapping structure based on the parent table and the one or more child tables;
   configuring a memory to store the mapping structure;
   partitioning, using a processor caching architecture, the parent table into one or more parent table partitions, and the one or more child tables into one or more child table partitions;
   determining one or more search grams based on a query, each of the one or more search grams being at least a portion of the query, wherein determining the one or more search grams comprises determining at least one gram vector for each search gram of the one or more search grams;
   identifying the parent table having the one or more parent table partitions including one or more parent records;
   identifying the one or more child table partitions from the one or more child tables, the one or more child table partitions including one or more child records, wherein the one or more child table partitions are associated with at least one of the one or more parent table partitions;
   scanning parent records in a parent table partition for the one or more search grams; and
   scanning child records in one or more second child table partitions associated with the parent table partition for the one or more search grams,
   wherein child records of gram vectors associated with a child table from the one or more child tables are sorted by a foreign key and a partition number.

2. The method of claim 1, further comprising:
   computing parent gram scores for the scanned parent records based on a degree of matching with the one or more search grams; and
   computing child gram scores for the scanned child records based on a degree of matching with the one or more search grams.

3. The method of claim 2, further comprising:
   computing aggregate scores based on the parent and child gram scores; and
   repeating the identifying the one or more child table partitions, scanning parent and child records, and computing parent and child gram scores and aggregate scores for each parent table partition.

4. The method of claim 3, further comprising:
   adding, based on the aggregate scores, second parent records and second child records to an output heap; and
   providing query results based on the aggregate scores.

5. The method of claim 3, wherein determining the one or more search grams further comprises determining a weight of each search gram of the one or more search grams, and wherein computing the aggregate scores comprises incrementing a score array by a weight of at least one search gram of the one or more search grams.

6. The method of claim 3, wherein the mapping structure comprises association information associated with the one or more parent table partitions and the one or more child table partitions, and wherein the method further comprises;
   referencing the mapping structure to determine associations among the one or more parent table partitions and the one or more child table partitions.

7. The method of claim 1, wherein the mapping structure comprises association information associated with the one or more parent table partitions and the one or more child table partitions, and wherein the method further comprises;
   referencing the mapping structure to determine associations among the one or more parent table partitions and the one or more child table partitions.

8. The method of claim 1, further comprising:
   determining a new child record for inserting into a child table partition associated with a second parent table partition having a parent record associated with the new child record;
   in response to determining an available row exists in the child table partition, inserting the new child record into the available row; and
   in response to determining an available row does not exist in the child table partition, generating a new child table partition, associating the new child table partition with the second parent table partition, and inserting the new child record into the new child table partition.

9. The method of claim 1, wherein a portion of a first search gram of the one or more search grams overlaps with a portion of a second search gram of the one or more search grams.

10. The method of claim 1, wherein the foreign key comprises a key associated with the parent table.

11. The method of claim 1, wherein the parent table is joined with multiple child tables.

12. The method of claim 1, wherein child records comprised in a child table partition are associated with parent records in a second parent table partition via a foreign key field or via common unique values.

13. The method of claim 1, wherein the one or more search grams scanned for during the scanning of the parent records are different from the one or more search grams scanned for during the scanning of the child records.

14. The method of claim 1, wherein a special partition, associated with the parent table, is associated with an outer join not associated with a parent record.

15. The method of claim 14, wherein the outer join comprises a child record.

16. A system for querying a parent table and one or more child tables, the system comprising:
- a processor;
- a memory; and
- a communications device, wherein the processor and the memory are in communication via the communications device, and wherein the processor is operable for:
  - generating a mapping structure based on the parent table and the one or more child tables;
  - configuring the memory to store the mapping structure;
  - determining one or more search grams based on a query, each of the one or more search grams being at least a portion of the query, wherein determining the one or more search grams comprises determining at least one gram vector for each search gram of the one or more search grams;
  - identifying the parent table having one or more parent table partitions including one or more parent records;
  - identifying one or more child table partitions from the one or more child tables, the one or more child table partitions including one or more child records, wherein the one or more child table partitions are associated with at least one of the one or more parent table partitions;
  - scanning parent records in a parent table partition for the one or more search grams; and
  - scanning child records in one or more second child table partitions associated with the parent table partition for the one or more search grams,
  - wherein child records of gram vectors associated with a child table from the one or more child tables are sorted by a foreign key and a partition number.

17. The system of claim 16, wherein the processor is further operable to add selected parent records associated with the parent table partition and selected child records associated with the one or more second child table partitions to an output heap.

18. The system of claim 16, further comprising: an input element for receiving the query from a user, or a display element for displaying search results to the user.

19. The system of claim 16, further comprising a processor caching architecture for partitioning the parent table into the one or more parent table partitions, and the one or more child tables into the one or more child table partitions.

20. A non-transitory computer readable medium including instructions that, when executed by a processor, cause the processor to perform a process for querying a parent table and one or more child tables, the process comprising:
- generating a mapping structure based on the parent table and the one or more child tables;
- configuring a memory to store the mapping structure;
- determining one or more search grams based on a query, each of the one or more search grams being at least a portion of the query, wherein determining the one or more search grams comprises determining at least one gram vector for each search gram of the one or more search grams;
- identifying the parent table having one or more parent table partitions including one or more parent records;
- identifying one or more child table partitions from the one or more child tables, the one or more child table partitions including one or more child records, wherein the one or more child table partitions are associated with at least one of the one or more parent table partitions;
- scanning parent records in a parent table partition for the one or more search grams; and scanning child records in one or more second child table partitions associated with the parent table partition for the one or more search grams,
- wherein child records of gram vectors associated with a child table from the one or more child tables are sorted by a foreign key and a partition number.

* * * * *